United States Patent [19]

Farkas et al.

[11] 4,420,965
[45] Dec. 20, 1983

[54] COOLING EFFECT SENSOR

[75] Inventors: Thomas P. Farkas, Bloomfield; Gary D. Burr, Berlin; Robert W. Smith, Simsbury, all of Conn.

[73] Assignee: Dynamic Controls Corporation, South Windsor, Conn.

[21] Appl. No.: 179,938

[22] Filed: Aug. 21, 1980

Related U.S. Application Data

[62] Division of Ser. No. 943,300, Sep. 17, 1978, Pat. No. 4,257,552.

[51] Int. Cl.³ .......................................... G01M 17/06
[52] U.S. Cl. ..................................................... 374/43
[58] Field of Search ............... 73/15 R, 190 R, 193 R, 73/204

[56] References Cited

U.S. PATENT DOCUMENTS

| | | | |
|---|---|---|---|
| 1,265,775 | 5/1918 | Hadaway, Jr. | 73/204 |
| 1,291,489 | 1/1919 | Hadaway, Jr. | 73/204 |
| 2,813,237 | 11/1957 | Fluegel et al. | 73/204 X |
| 3,142,170 | 7/1964 | Calhoun | 73/15 |
| 3,258,760 | 6/1966 | Carlson | 73/204 X |
| 3,781,839 | 12/1973 | Bodge | 73/204 |

FOREIGN PATENT DOCUMENTS 1121129 7/1968 United Kingdom.

OTHER PUBLICATIONS

S.A.E. Aerospace Applied Thermodynamics Manual, 2nd Edition, 1969.

Primary Examiner—Herbert Goldstein
Attorney, Agent, or Firm—McCormick, Paulding & Huber

[57] ABSTRACT

A closed loop control apparatus utilizes a cooling effect sensor to measure the cooling capacity of a fluid in a supply conduit connected to one or more thermal loads. The sensor includes an electrical heater that is regulated to heat a sampled portion of the cooling fluid at a known rate, and a temperature sensor positioned downstream of the heater to measure the temperature of the heated fluid and thereby determine the cooling effect or capacity of the fluid. A control signal developed by the temperature sensor is fed back to a flow modulating valve that adjusts the flow of cooling fluid to the thermal loads.

5 Claims, 5 Drawing Figures

U.S. Patent   Dec. 20, 1983   Sheet 2 of 2   4,420,965
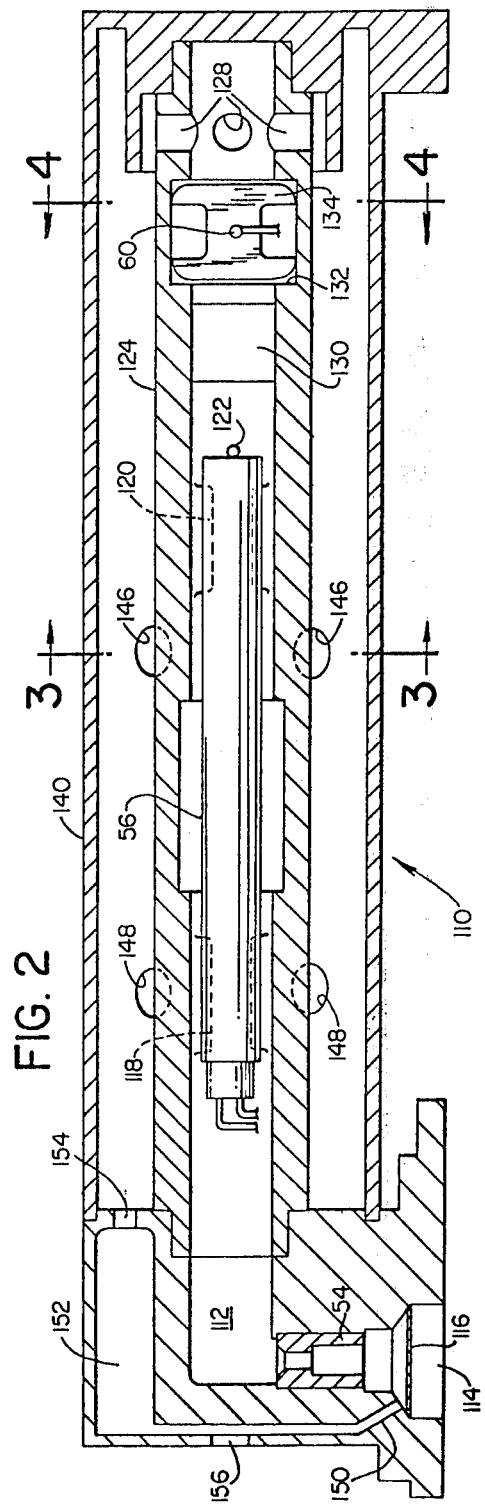
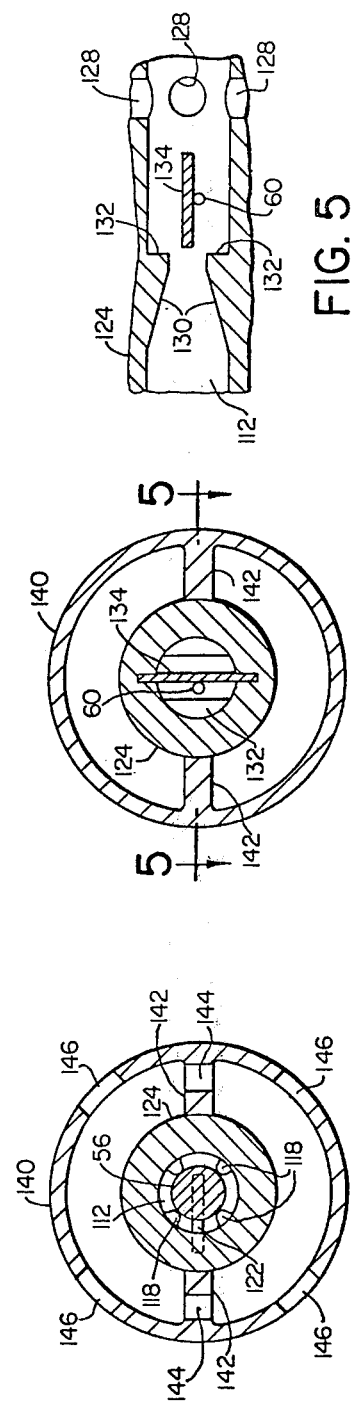

COOLING EFFECT SENSOR

This is a division of application Ser. No. 943,300 filed Sept. 17, 1978 now U.S. Pat. No. 4,257,552.

BACKGROUND OF THE INVENTION

The present invention relates to a method and apparatus for controlling the flow of a temperature regulating fluid through a supply conduit to one or more thermal loads. In particular, the apparatus is concerned with a closed loop control for regulating the flow of a heat transfer fluid by means of a sensor that measures the cooling or heating capacity of a sampled portion of the fluid in a flow path parallel to the thermal loads.

Temperature control systems, especially those for aircraft and other systems that may include radar, avionics and other sensitive electronic equipment, are generally automatically controlled in accordance with the various limitations that are established by the craft and the system in which the controls are installed. In general the control systems employ a temperature sensor which produces a signal that is applied to a flow modulating device to control the volume or flow rate of a temperature controlling fluid, such as air, through the avionics and other compartments or fixtures which represent thermal loads to the temperature control system.

In power dissipating units such as avionics and other electronic compartments excessive heat is generally produced and, accordingly, cooling is required to maintain the temperature of the electronic components within a predetermined temperature range. However, other components which are positioned in particularly cold locations in a craft may require heating and, accordingly, it should be understood that within the scope of the present invention reference to a temperature regulating or heat exchange fluid is intended to apply to fluids which either heat or cool a thermal load.

One type of prior art temperature control system utilizes a cooling effect sensor which measures the cooling capacity of a fluid that is supplied to a thermal load. In such a sensor, a portion of the heat transfer fluid is sampled in a conduit that extends in parallel relationship with the thermal load, and a heater which effectively simulates a thermal load applies heat to the sampled fluid at a regulated rate. The heater is generally an electrical heater supplied with current at a regulated voltage and the temperature sensor is integrally mounted on a layer of insulation surrounding the heater. In operation the sampled fluid flows over the heater and removes heat in a manner dependent upon the cooling capacity of the fluid, and the heater temperature measured by the sensor reflects that capacity.

It is an object of the present invention to provide a closed loop temperature control system utilizing an improved sensor to detect the cooling or heating capacity of a fluid and to modulate the flow of the fluid through a thermal load accordingly.

SUMMARY OF THE INVENTION

The present invention resides in a method and apparatus for controlling the flow of a temperature regulating fluid through a supply conduit to a thermal load such as an avionics compartment in an aircraft.

The apparatus which carries out the method of the invention includes flow modulating means such as an actuator controlled butterfly valve that is connected in the supply conduit and is adjustable to modulate the flow of a temperature regulating fluid through the conduit to one or more thermal loads. Actuation of the valve increases or decreases the flow of the regulating fluid to make corresponding adjustments in the heating or cooling effect of the fluid upon the loads.

Thermal load simulating means and temperature sensing means forming in one embodiment an improved cooling effect sensor are connected with the supply conduit for sampling the temperature regulating fluid and measuring the cooling or heating capacity of the modulated flow. However, the thermal load simulating means such as an electrically regulated heater applies heat at a controlled rate to the sampled fluid, and the temperature sensing means monitors the fluid downstream of the simulating means to measure the effect of the controlled rate of heat on the fluid. For example, if the cooling capacity of the fluid increases due to its lower temperature or higher density or moisture content, the increased capacity is detected by the sensing means from the fluid, and the sensing means through suitable control means makes corresponding adjustments of the flow modulating means to reduce the quantity of fluid reaching the thermal loads. Conversely, if the cooling capacity diminishes, an increase in the fluid flow is produced.

The simulating means and the temperature sensing means utilized by the present invention are structured to more accurately reflect the cooling or heating effect of the fluid in the output signal produced by the sensing means. Also a unique dynamic insulating means may be employed to eliminate signal errors caused by heat loss or gain in the various elements measuring the fluid capacity.

BRIEF DESCRIPTION OF THE DRAWINGS

FIG. 2 is a cross sectional view illustrating one embodiment of a cooling effect sensor structured in accordance with the present invention.

FIG. 3 is a cross sectional view of the cooling effect sensor viewed along the sectioning line 3—3 in FIG. 2.

FIG. 4 is a cross sectional view of the cooling effect sensor as viewed along the sectioning line 4—4 in FIG. 2.

FIG. 5 is a fragmentary sectional view of the sensor as viewed along the sectioning line 5—5 of FIG. 4.

DESCRIPTION OF THE PREFERRED EMBODIMENTS

Figure 1:
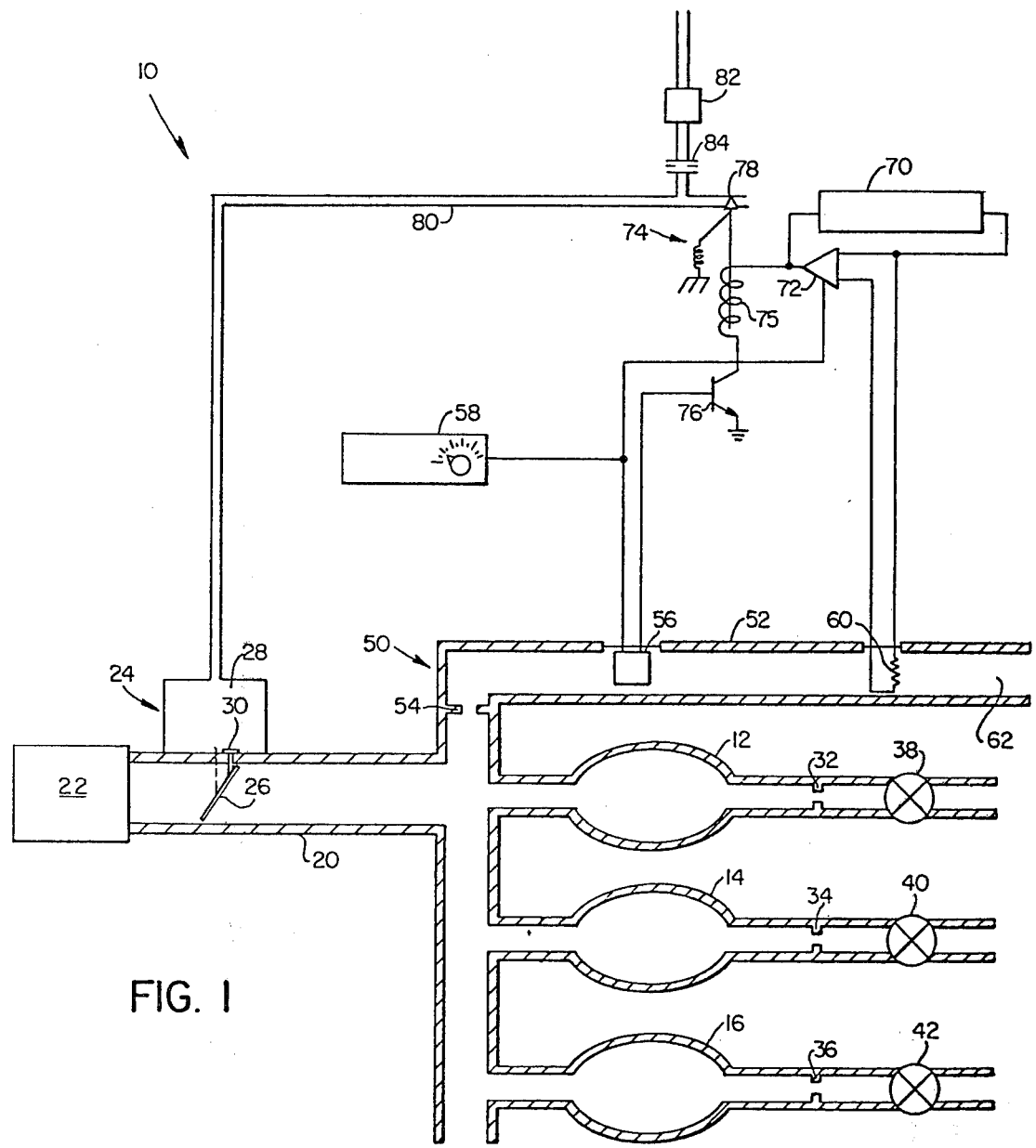
FIG. 1 is a schematic diagram illustrating the apparatus for controlling a temperature regulating fluid in accordance with the present invention.

FIG. 1 illustrates a closed loop control apparatus, generally designated 10, for regulating the flow of a heat transfer or temperature regulating fluid to a plurality of thermal loads 12, 14 and 16. While the invention has application to systems which either heat or cool a thermal load, the subsequent description is directed to one embodiment of the control system in which a relatively cool fluid, such as air, bled from the compressor stage of an aircraft engine or other source is directed through a relatively hot compartment such as the avionics, radar or guidance package within the aircraft for cooling purposes.

Accordingly, the control apparatus 10 is connected with a fluid supply conduit 20 through which a continuous flow of cooling air passes from an upstream source 22 to the downstream thermal loads 12, 14 or 16. A flow modulating valve 24 includes a butterfly flapper disc 26 which is mounted in the conduit 20 to increase or decrease the flow of cooling air in accordance with the load demands and the cooling capacity of the air. The butterfly disc is pivotally mounted to assume various angles relative to the axis of the conduit and is angularly positioned by means of a pneumatic actuator 28. An adjustable stop screw 30 insures that the disc 26 maintains a minimal flow of fluid through the conduit for regulation purposes.

The thermal loads 12, 14 and 16 are connected in parallel to the conduit 20 so that each load is supplied with the cooling air independently of the other loads. The cooling air is discharged from each of the loads through flow balancing orifices 32, 34 and 36 and associated shut-off valves 38, 40 and 42 respectively. The orifices are selected to permit a predetermined flow of the coolant through the respective loads at a given upstream pressure, and thereby permit the flow rates to be appropriately scaled for the cooling demands of the different loads. The shut-off valves may be energized coincidentally with their respective loads to allow the cooling fluid to flow through the loads when they are energized and to terminate the flow fluid otherwise. Accordingly, cooling fluid is drawn from the source 22 only on an as-needed basis and excessive load demands are not imposed on the source.

The control apparatus 10 employs an improved cooling effect sensor, generally designated 50. The improved sensor permits the cooling capacity of the air passing through the conduit 20 to be accurately detected and therefore, enables the flow modulating valve 24 to more accurately adjust the flow of fluid to the thermal loads in accordance with the system parameters.

The sensor 50 is comprised of a sampling conduit 52 which bleeds a portion of the cooling air out of the conduit 20 at a position downstream of the flow modulating valve 24 and upstream of the thermal loads 12, 14 and 16. the conduit discharges air to the same ambient atmosphere as the coolant exiting from the thermal loads so that the sensor 50 has a flow path parallel to that through the loads.

The upstream end of the sampling conduit 52 defines a passageway entrance containing a flow regulating orifice 54. The orifice 54 limits the amount of cooling air that is bled through the sensor 50 in accordance with the operating parameters of the supply duct and the sensor 50. After the cooling air passes the orifice 54 it is ducted over a regulated heater 56 which is preferably an electrical resistance heater receiving power from a regulated power supply 58. The heater 56 applies heat to the sampled air in the conduit 52 at a known and generally constant rate in accordance with the adjustment of the power supply 58. As the cooling air passes over the heater, the air absorbs heat in a manner dependent upon the cooling capacity. If the heater is regulated at a constant power level, the temperature of the air which has passed over the heater varies in accordance with the temperature of the air at the passageway inlet, the density of the fluid, and the moisture content of the air. All of these factors constitute parameters which measure the cooling capacity of the air and, therefore, the temperature of the sampled air downstream of the heater becomes a measure of the cooling capacity of the air passing through the thermal loads.

A temperature sensor in the form of a thermistor 60 detects the temperature of the sampled, heated air at a position in the fluid passageway of conduit 52 downstream from the heater and intermediate the heater and the exit 62 where the sampled fluid is discharged into the surrounding atmosphere. Since the thermistor 60 is not mounted directly to the heater as in the prior art devices, the temperature measured by the thermistor accurately reflects the temperature of the air and, accordingly, its cooling capacity.

The thermistor 60 develops an electrical signal related to the detected air temperature, and that signal is utilized to operate the modulating valve 24 and maintain a predetermined air temperature at the thermistor. In this manner a controlled cooling effect is provided for the heater 56 as well as the thermal loads 12, 14 and 16.

A temperature signal developed by the thermistor 60 is compared in a bridge circuit forming part of the stabilization network 70 with a predetermined temperature signal, and the error is applied to the operational amplifier 72 which serves as a driver for a proportional solenoid valve 74. The amplifier drives the solenoid 76 connected to ground through a normally conductive transistor 76, and operates a spring-biased bleed poppet 78 in a controlled air pressure line 80. The line 80 is supplied with servo-control air through a filter 82 and a pressure control orifice 84, and is connected to the pneumatic actuator 28 that operates the butterfly disc 26 of the modulating valve 24.

In this embodiment of the invention, the amplifier 72 drives the solenoid valve 78 with current that is proportional to the force applied to the spring-biased poppet 78 so that the poppet is urged toward a closed position by the force of the solenoid. The pneumatic actuator 28 is also spring-biased to move the butterfly disc 26 to its fully open position and, therefore, the control pressure developed within the line 80 is utilized to move the disc toward its closed position. Under these circumstances if the drive means for the solenoid valve 74 fails or if the pneumatic actuator 28 fails, the disc 26 moves to its fully open position and provides the maximum cooling effect available from the source. Accordingly, the servo-controls for the modulating valve 24 are fail-safe.

Accordingly, the improved cooling effect sensor 50 with the thermistor 60 located downstream in the sampled air flow from the heater 56 controls the modulating valve 24 in accordance with the cooling effect of the air flowing through the conduit 20 at the entrance to the sampling conduit 52. For example, if the cooling effect of the air increases due to a lower temperature fluid delivered from the source 20, the modulating valve closes slightly in order to reduce the flow rate through the thermal loads 12, 14 and 16 as well as the sensor 50. Additionally, as the thermal loads are switched in and out of the cooling system by means of the shut-off valves 38, 40 and 42, pressure fluctuations at the orificed entrance of the sampling conduit 52 produce a measurable change in the flow of sampled air through the conduit and, correspondingly, the temperature measured by the thermistor 60. The thermistor accordingly adjusts the position of the butterfly disc 26 to re-establish that pressure which maintains the desired temperature and cooling effect within the sensor 50 as well as in the parallel flow paths through the thermal loads.

It will be recognized that the heater 56 simulates a thermal load such as the actual loads 12, 14 and 16 which require cooling in parallel flow paths. Since the heat dissipated to the sampled fluid is known or regulated at a constant level, the cooling effect of the fluid passing through the sensor 50 as well as that through the thermal loads 12, 14 and 16 is measured by the thermistor 60 to make appropriate adjustments in the modulating valve 24.

Another and more detailed embodiment of the cooling effect sensor of the present invention is shown and described in connection with FIGS. 2–5. The sensor, generally designated 110, is designed to be connected to a conduit carrying cooling air in the same manner as the sensor 50 illustrated in FIG. 1. Furthermore, the corresponding elements of the sensors 50 and 110 such as the orifice 54, the electrical heater 56 and the temperature sensing thermistor 60 bear the same reference numerals.

The cooling effect sensor 110 operates in a manner similar to the sensor 50 in that it includes a fluid passageway 112 having an entrance 114 for sampling a temperature controlling air or other fluid that is supplied through a conduit to a plurality of thermal loads connected in parallel with the sensor. At the entrance a filter or screen 116 removes heavy particles of dust or dirt before the air passes through the flow control orifice 54. From the orifice the air passes over an elongated cylindrical, electrical heater 56 that is regulated in its power output to deliver heat to the sampled fluid at a constant rate. As shown most clearly in the cross sectional view of FIG. 3, the heater 56 is supported co-axially within a cylindrical conduit member 124 defining the mid portion of the passageway 112 by a plurality of circumaxially spaced lands 118 at one end of the heater and similar lands 120 at the opposite end of the heater. The lands insure that the heater remains co-axially positioned within the passageway with an annular spacing at each point along the heater so that the sampled air is completely exposed to the heater surface and absorbs the constant flow of heat. A locating pin 122 seen most clearly in FIGS. 2 and 3 is attached to the downstream end of the heater and projects laterally into the conduit member 124 to fix the heater at a given station within the passageway.

Downstream of the heater 56, a flow accelerating means concentrates the flow of heated, sampled air as it passes over the thermistor 60. The accelerating means as shown most clearly in FIGS. 2 and 5 is comprised by tapered portions 130 of the walls forming the passageway 112 at this section of the sensor. The tapered portions terminate in downstream lips 132 immediately adjacent an H-clip 134 supporting the thermistor 60. Acceleration of the heated air over the thermistor 60 improves heat transfer between the air and the thermistors and thereby decreases the response time of the sensor to changes in temperature and correspondingly the cooling effect of the air that has been sampled.

The discharge ports 128 at the downstream end of conduit member 124 do not vent the passageway 112 directly to the ambient atmosphere surrounding the sensor 110, but instead, discharge the heated air into a generally annular space surrounding the conduit member 124 within an insulating jacket 140 positioned co-axially about the conduit member. As shown in FIGS. 3 and 4, ribs 142 maintain the co-axial positioning of the jacket and member 124, and equalizing ports 144 extend through the ribs to insure fluid communication throughout the entire annular space. Accordingly, the heated air discharged from the ports 128 is directed axially over the conduit member 124 in a reverse flow path. A plurality of circumaxially spaced venting apertures 146 and 148 are provided in the jacket 140, and as the heated air within the jacket reaches these apertures, it is then discharged to the ambient atmosphere.

The reverse flow of the heated air develops a dynamic insulating blanket over the portion of the conduit member 124 carrying the heated air between the heater 56 and the thermistor 60. Since the air temperatures are approximately the same both within this portion of the conduit member and externally of this portion, there is minimal heat loss (or gain) from the air within the passageway 112 and the air, therefore, passes from the heater 56 to the thermistor 60 under virtually adiabatic conditions. Accurate measurement of the cooling effect requires adiabatic conditions until the air temperature is sensed.

A bleed port 150 is provided at the entrance of the passageway 112 adjacent the filter screen 116 and communicates through a passageway 152 and an orificing port 154 with the annular insulating space surrounding the conduit member 124 within the jacket 140. The passageway 152 preferably circumscribes a large portion of the passageway 112 adjacent to one end of the conduit member 124 in order to define another annular insulating space which restricts heat transfer between the ambient atmosphere and the sampled cooling air ducted through the orifice 54 to the heater 56. Heat loss or gain by the sampled air is again avoided.

The orificing port 154 as well as a static bleed port 156 are selected to establish a flow rate of unheated insulating air substantially equivalent to the flow rate of the cooling air in the passageway 112 which is heated and subsequently discharged into the jacket 140 also. The heated air passing into the jacket from the ports 128 and the unheated air passing into the jacket from the port 154 meet and mix in the vicinity of the venting apertures 146 and 148 prior to passing outwardly to the ambient atmosphere surrounding the jacket 140. It should be noted that the venting apertures are located equal distances from the midpoint of the heater 56 where the heated air temperature is midway between the temperatures at the inlet and exit of the passageway 112. The temperature of the mixed insulating air around the conduit member 124 at this point is approximately the same to again minimize heat loss or gain.

Accordingly, the flow of cooling air through the passageway 152 and the reverse flow of heated air from the ports 128 to the vents 146 and 148 maintain substantially adiabatic conditions throughout the various sections of the cooling effect sensor 110 even though different temperature conditions exist in these sections. By maintaining adiabatic conditions, the sensor 110 eliminates errors in measuring the cooling effect of the sampled fluid and a more accurate measurement of the cooling effect and control of the cooling air is obtained.

In summary, a method and apparatus for controlling the flow of a temperature regulating fluid has been disclosed together with an improved cooling effect sensor which provides a more accurate measure of the cooling effect of the fluid. The sensor has improved time response and eliminates measuring errors due to its construction and the maintenance of substantially adiabatic conditions throughout the sensor. Furthermore, in comparison to certain prior art sensors which utilize heated wires to detect the cooling effect of a fluid, the present invention also constitutes an improvement since the formation of deposits or contaminates on the temperature sensing element, that is the thermistor 60, do not affect the calibration of the sensor as in the prior art units.

While the present invention has been described in several preferred embodiments, it should be understood that numerous modifications and substitutions can be had without departing from the spirit of the invention. For example, the housing and other structural components of the cooling effect sensor may be constructed of a variety of materials, but preferably the materials should have poor heat transfer characteristics to minimize errors caused by heat loss or gain, and a low specific heat to reduce the response time of the sensor. In one embodiment the sensor may be constructed of thermal plastic or a settable material such as polysulphone which may be injection molded. Other forms of insulation than the dynamic insulating apparatus described in connection with FIGS. 2-4 may also be utilized to minimize heat gain or loss from the sampled air. Accordingly, the present invention has been described in a preferred embodiment by way of illustration rather than limitation.

We claim:

1. A cooling effect sensor for detecting the cooling capacity of a moving heat transfer fluid comprising:
   conduit means defining a fluid passageway having an entrance at one end for receiving the moving fluid and an exit at the other end from which the moving fluid is discharged;
   an insulating jacket mounted over the conduit means and having one end communicating with the fluid passageway at the entrance and an opposite end communicating with the fluid passageway at the exit, and discharge vents in the jacket intermediate the one and opposite ends;
   heating means connected with the conduit means for applying predetermined quantities of heat to the moving fluid in the fluid passageway; and
   temperature sensing means positioned in the fluid passageway downstream in the fluid flow from the heating means for measuring the temperature of the moving fluid to which the predetermined quantities of heat are applied.

2. A cooling effect sensor for detecting the cooling capacity of a fluid as defined in claim 1 wherein the heating means comprises a regulated heater positioned in the fluid passageway in contact with the moving fluid.

3. A cooling effect sensor as defined in claim 2 wherein the regulated heater is an electrical heater.

4. A cooling effect sensor as defined in claim 1 further including orificing means in the passageway and the jacket for regulating the fluid flows through the passageway and the jacket.

5. A cooling effect sensor for detecting the cooling capacity of a moving heat transfer fluid comprising:
   conduit means defining a fluid passageway having an entrance at one end for receiving the moving fluid and an exit at the opposite end from which the moving fluid is discharged;
   heating means connected with the conduit means for applying predetermined quantities of heat to the moving fluid in the fluid passageway;
   temperature sensing means positioned in the fluid passageway downstream in the fluid flow from the heating means for measuring the temperature of the moving fluid to which the predetermined quantities of heat are applied; and
   dynamic insulating means for preventing heat transfer between the fluid moving in the passageway and the environment around the passageway including a fluid jacket covering the passageway of the conduit means substantially from the entrance to the exit and the jacket at the end adjacent the passageway entrance having an inlet for receiving additional moving fluid at the same temperature as the moving fluid entering the fluid passageway, and the jacket at the end adjacent the passageway exit communicating with the exit to receive the heated fluid discharged from the passageway, the jacket also defining vents in the vicinity of the heating means for discharging the received fluid.

* * * * *